(12) United States Patent
Bergamini et al.

(10) Patent No.: US 11,536,273 B2
(45) Date of Patent: *Dec. 27, 2022

(54) HIGH EFFICIENCY DOUBLE SUCTION IMPELLER

(71) Applicant: NUOVO PIGNONE TECNOLOGIE—S.R.L., Florence (IT)

(72) Inventors: Lorenzo Bergamini, Florence (IT); Marco Torresi, Florence (IT); Tommaso Capurso, Florence (IT)

(73) Assignee: NUOVO PIGNONE TECNOLOGIE SRL, Florence (IT)

( * ) Notice: Subject to any disclaimer, the term of this patent is extended or adjusted under 35 U.S.C. 154(b) by 0 days.

This patent is subject to a terminal disclaimer.

(21) Appl. No.: 17/193,292

(22) Filed: Mar. 5, 2021

(65) Prior Publication Data
US 2021/0190073 A1    Jun. 24, 2021

Related U.S. Application Data

(63) Continuation of application No. 16/404,097, filed on May 6, 2019, now Pat. No. 10,941,777, which is a continuation-in-part of application No. PCT/EP2017/078356, filed on Nov. 6, 2017.

(30) Foreign Application Priority Data

Nov. 7, 2016  (IT) .......................... 102016000111763

(51) Int. Cl.
*F04D 29/22* (2006.01)
*F04D 1/00* (2006.01)
*F04D 29/00* (2006.01)
*F04D 29/62* (2006.01)

(52) U.S. Cl.
CPC .......... *F04D 1/006* (2013.01); *F04D 29/007* (2013.01); *F04D 29/2205* (2013.01); *F04D 29/2255* (2013.01); *F04D 29/628* (2013.01); *Y02E 10/20* (2013.01)

(58) Field of Classification Search
CPC .... F04D 1/006; F04D 29/007; F04D 29/2255; F04D 17/105; F04D 17/162
See application file for complete search history.

(56) References Cited

U.S. PATENT DOCUMENTS

| | | | |
|---|---|---|---|
| 4,322,200 A * | 3/1982 | Stiegelmeier | F04D 29/2222 416/184 |
| 10,941,777 B2 * | 3/2021 | Bergamini | F04D 29/2255 |

* cited by examiner

*Primary Examiner* — Sabbir Hasan
(74) *Attorney, Agent, or Firm* — Baker Hughes Patent Org; Marc A Vivenzio

(57) ABSTRACT

A double suction impeller is disclosed. In at least one embodiment, the impeller is configured for centrifugal pumps and hydraulic power recovery turbines. The impeller's flow-path arrangement comprises inter-blade channels, intersecting each other at the impeller's outer diameter and defining a variable cross section shape, so that the equivalent number of blades is at least doubled with respect to a conventional configuration obtained by the coupling of two single suction impellers and an improved control over the velocity of the flow within the inter-blade channels is achieved.

12 Claims, 4 Drawing Sheets

STATE OF THE ART

HIGH EFFICIENCY DOUBLE SUCTION IMPELLER

CROSS-REFERENCE TO RELATED APPLICATIONS

This application is a continuation of U.S. Pat. No. 16,404,097, filed May 6, 2019, issuing on Mar. 9, 2021 as U.S. Pat. No. 10,941,777, which is a continuation-in-part of International Application No. PCT/EP2017/078356, filed Nov. 6, 2017, which claims priority to Italian Application No. 102016000111763, filed Nov. 7, 2016. All of the foregoing patents and patent applications are incorporated by reference as part of the present disclosure.

BACKGROUND

The present disclosure relates to a high efficiency double suction impeller, e.g., one that may be used for centrifugal pumps.

Radial flow turbo machinery devices are particularly adapted to convert shaft power to kinetic energy (and vice versa) by accelerating (or decelerating) a fluid in a revolving device called impeller. When used as power-absorbing machines, impellers are commonly used to raise the pressure of a fluid or induce a fluid flow in a piping system.

The impeller is the device, within the turbo machinery, that, rotating, exchanges energy with the fluid. In its simplest implementation, the impeller comprises a plurality of blades fitted onto a hub plate. The shape and the geometry of impeller blades can be of many different types depending on the use, the rating, the performance of the turbo machinery.

Having defined the specific speed, NS, of a pump as follows:

$$NS = \frac{nQ^{1/2}}{1.1618 \, H^{3/4}}$$

where,
n=rotating speed in revolution per minute
Q=volumetric flow rate in [m³/h]
H=differential head [m]
for centrifugal pumps of capacity larger than 10 m^3/h designed with low or medium specific speed values (e.g., NS<1600) and a double suction configuration, an impeller with a small number of blades is required in order to keep the head vs flow rate stable and continuously rising towards zero flow. This requirement is very important especially in case of more than one centrifugal pump employed in parallel, each working with a fraction of the available flow. Furthermore, centrifugal pumps of large capacity designed for low or medium specific speed values and for medium or high values of hydraulic head, require impellers having large diameters and narrow exit width. Double suction impellers are usually composed by two single suction impellers each elaborating half of the total flow and arranged in a back-to-back configuration.

In the state-of-the-art, centrifugal pumps having impellers provided with a center rib and staggered blades, the ratio between the impeller exit width b2 and the impeller diameter D2 can be well lower than 0.05. Impellers of this kind often show an unstable head vs flow rate characteristic curve. In addition to that, another drawback of this kind of impellers lies in the low blade exit angles (normally between 15° and 20°) and corresponding large wrap angles (normally between 120° and 270°) that are required to maintain acceptable slip factor values. As a result, the hydraulic efficiency of the state-of-the-art impeller of this kind is typically smaller than 95%.

Furthermore, the low blade load typical of this kind of impellers (normally corresponding to head coefficients "psi" lower than 1, psi being equal to:

$$psi = \frac{2gH}{u_2^2}$$

where
g=gravity acceleration in [m/s^2]
H=differential head in [m]
u2=peripheral speed of the impeller in [m/s]) increases the required diameter of the impeller, thus increasing the disk friction losses by 1%-2% when compared to impellers having head coefficients greater than 1.

The achievable head coefficient can be increased by employing conventional split blades impellers, but this choice does not solve the problem of the narrow b2/D2 and poor head curve stability. Moreover, the number of leading edges of conventional split blades impellers is doubled, causing additional hydraulic losses.

SUMMARY

Embodiments of the present invention therefore relate to a double suction impeller having the channels between the blades starting from both inlets and crossing the median axis of the impeller exit in such a way that, as a result, the equivalent blades number is doubled with respect to a conventional configuration obtained by the coupling of two single suction impellers.

In the new impeller, the reduction of the slip by increasing the equivalent number of blades permits to reduce the diameter of the impeller, thus reducing the size and therefore the manufacturing cost of the pump installing said impeller.

Compared to a conventional impeller provided with splitter blades, embodiments of the new impeller do not introduce any additional leading edge and corresponding losses.

For low specific speed pumps the new shape of the inter-blade channels of the impeller is such that the hydraulic diameter is increased and the length of each channel reduced, thus reducing the hydraulic losses with respect conventional impellers.

The cross section area of the inter-blade channels of the impeller is designed to have control over the velocity of the flow within the inter-blade channel Therefore, the shape of the inter-blade channels is adapted to avoid that the inter-blade channels of the impeller intersect with each other and at the same time to have a cross-sectional area that changes its shape along the flow path.

Furthermore, the reduction of the impeller diameter brings also along a significant reduction of the losses due to disk friction, thus increasing the overall pump efficiency.

The advantages and benefits associated to the new double suction impeller, with respect to an equivalent state-of-the-art impeller, increase as the operating speed of the new double suction impeller is decreased.

The impeller may be shrouded or unshrouded, and it can be made of one single piece or made of two pieces merged where the blades coming from opposite side adjoin.

The main application for the new double suction impeller is within centrifugal pumps, pump as turbine (PAT) and hydraulic power recovery turbines (HPRT) especially, but not exclusively, intended for refinery, petrochemical and pipelines. However, other applications are possible and contemplated.

BRIEF DESCRIPTION OF THE DRAWINGS

These and other features, aspects, and advantages of embodiments of the present invention will become better understood when the following detailed description is read with reference to the accompanying drawings in which like characters represent like parts throughout the drawings, wherein.

DETAILED DESCRIPTION

With reference to the attached drawings and according to an exemplary embodiment, embodiments of the present invention relate to new a double suction impeller, in particular for centrifugal pumps, wherein the flow-path arrangement is characterized by inter-blade channels intersecting each other at the impeller outer diameter.

Figure 1:
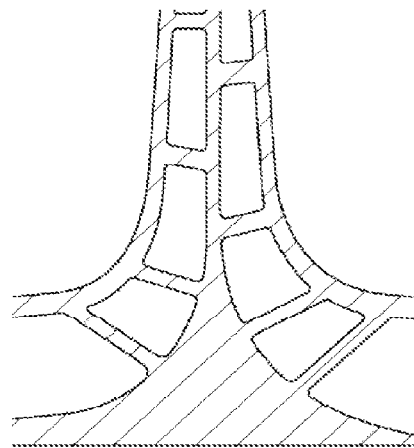
FIG. 1 illustrates a meridional section of a state of the art double suction impeller.
Figure 2:
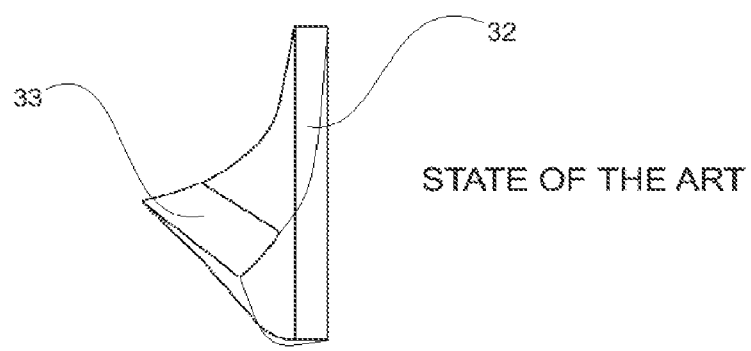
FIG. 2 illustrates a view of the inter-blade channel of the state of the art double suction impeller.
Figure 3:
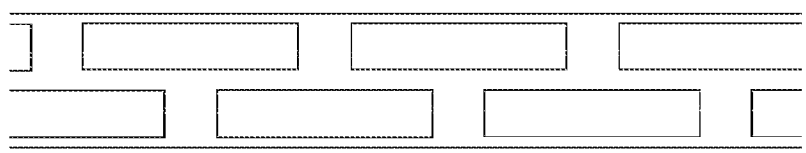
FIG. 3 illustrates a detail of the outer diameter arrangement of the state of the art double suction impeller.

In one embodiment, the new double suction impeller comprises channels between the blades starting from both inlets and intersecting at the outer diameter of the impeller in such a way that the equivalent blade number is doubled with respect to a conventional configuration obtained by simply adjoining to a central rib two single suction impellers, as illustrated in FIGS. 1, 2 and 3.

In greater detail, and with reference to FIGS. 4, 5, 6, 7, 8, 9 and 11, the new double suction impeller includes a shrouded impeller 10. The shrouded impeller 10 may further include a hub 11 associated with a tubular center bore 12. The tubular center bore 12 may be adapted to receive the impeller drive shaft which is drivingly connected thereto, generally by a key and a keyway.

The shrouded impeller 10 can be made either of one single piece—or assembly—or it can be made of a plurality of assemblies, e.g. comprising one left shroud, one right shroud and a central core.

In one embodiment, the new impeller is made of one single assembly, and the hub 11 further includes a plurality of blades 13 integrally attached to the hub 11 and to a pair of integral shrouds, a left side shroud 14 and a right side shroud 15. Each one of the integral shrouds 14, 15 is provided with a center aperture 16, 31 that constitutes the impeller eye. The impeller eye is adjacent to said tubular center bore 12 and comprises an aperture edge 17 with an aperture edge radius and an aperture rim 18 with an aperture rim radius.

The left side shroud 14 defines the left side aperture and the right side shroud 15 defines the right side aperture of the double suction impeller according to the present invention.

The outer edge of said left side shroud 14 and the outer edge of said right side shroud 15 define the impeller exit, said impeller exit having a width 19 and a median plane 20.

Figure 5:
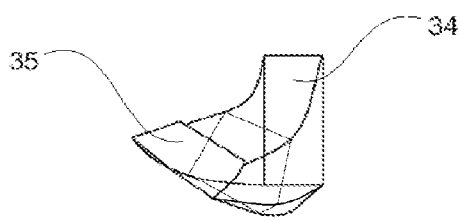
FIG. 5 illustrates a view of the inter-blade channel of another embodiment of the new double suction impeller according to the present disclosure.
Figure 11:
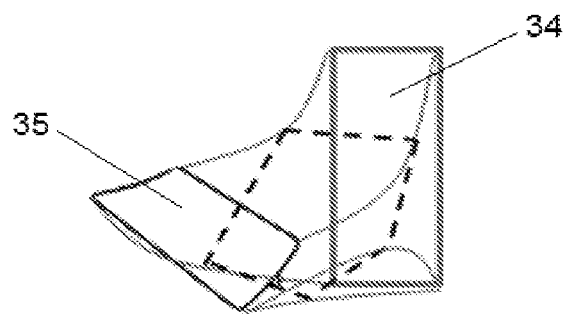
FIG. 11 illustrates a view of the inter-blade channel of another embodiment of the new double suction impeller according to the present disclosure.

In greater detail, each pair of adjacent blades 13 of said plurality of blades 13 define a plurality of inter-blade channels, referred to in FIGS. 5 and 11. Said inter-blade channels are adapted to connect a plurality of input apertures, located within the center apertures of both said left side shroud 14 and said right side shroud 15, to a plurality of output apertures located on said impeller exit.

Figure 4:
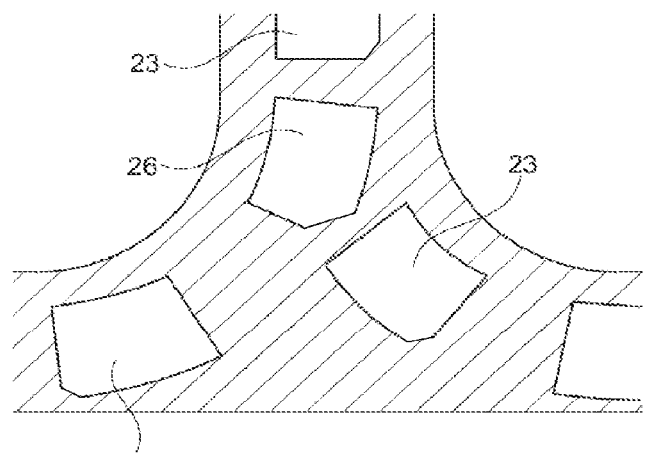
FIG. 4 illustrates a detail of the section of an embodiment of a new double suction impeller according to the present disclosure.
Figure 6:
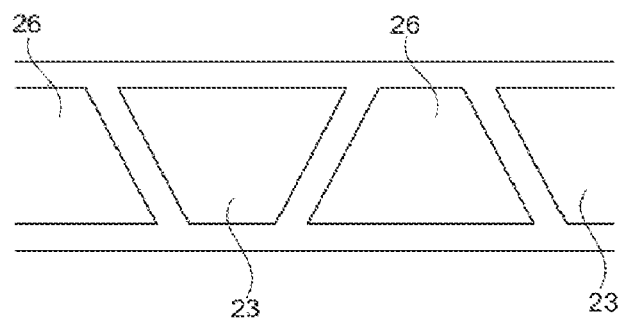
FIG. 6 illustrates a detail of the outer diameter arrangement of another embodiment of the new double suction impeller according to the present disclosure.
Figure 7:
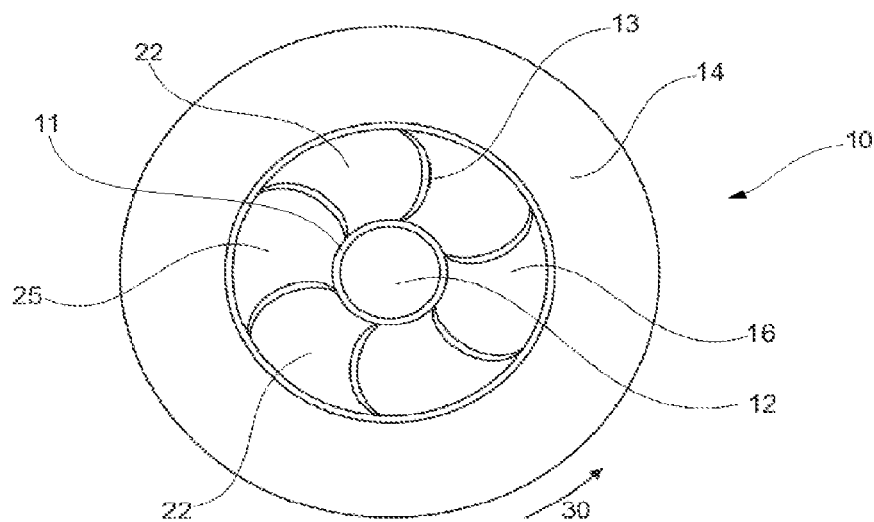
FIG. 7 illustrates a first front view of another embodiment of the new double suction impeller according to the present disclosure.
Figures 8, 9:
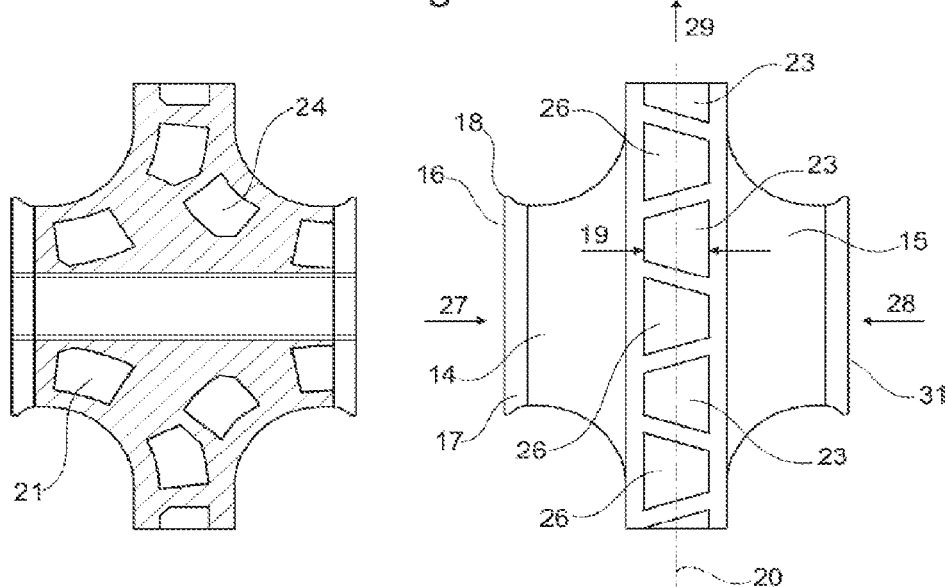
FIG. 8 illustrates a meridional cross section of an embodiment of the new double suction impeller according to the present disclosure.
FIG. 9 illustrates a side view of an embodiment of the new double suction impeller according to the present disclosure.
Figure 10:
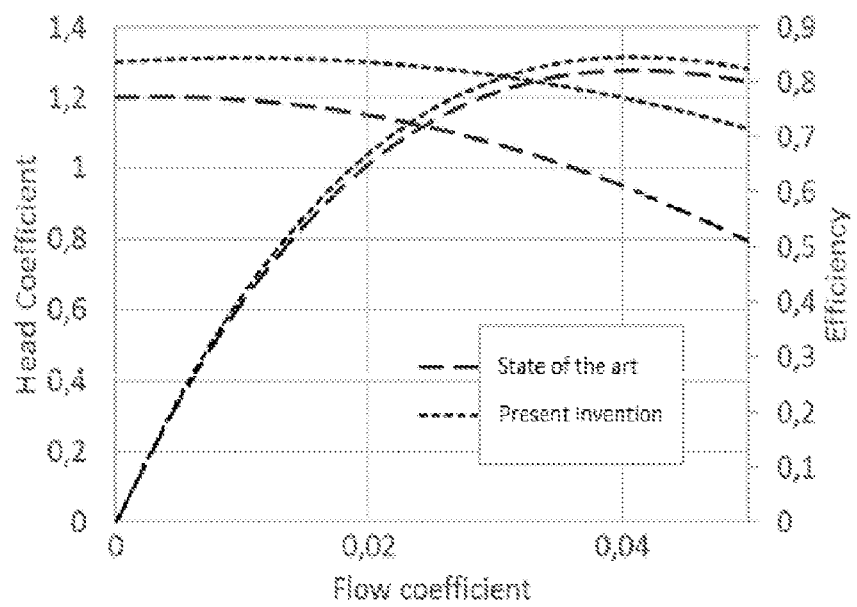
FIG. 10 illustrates a graph plotting the efficiency and the head coefficient vs the flow coefficient of the new double suction impeller according to the present disclosure compared to state-of-the-art impellers.

With reference, in particular, to FIGS. 4 and 6, said inter-blade channels comprise left side inter-blade channels 21, having their respective input apertures 22 located within the center aperture of said left side shroud 14, and right side inter-blade channels 24, having their respective input apertures 25 located within the center aperture of said right side shroud 15.

Advantageously, said left side inter-blade channels 21 and said right side inter-blade channels 24 are such as intersecting the median plane 20 of said impeller exit in a way to dispose the output apertures 23 of said left side inter-blade channels 21 to be aligned and alternated with the output apertures 26 of said right side inter-blade channels 24, on said impeller exit.

In operation, when rotated, fluid will be drawn axially into the impeller as indicated by the arrows 27, 28, impelled by the plurality of blades 13 passing between the hub 11 and said left and right shrouds 14, 15 and finally expelled radially through said exit as indicated by the arrows 29. The impeller runs in the direction of arrow 30 in a suitable housing having axial inlets and a circumferential volute or diffuser outlet passage.

In the double suction impeller according to the present invention, the effect connected to the crossing by said inter-blade channels of the median axis of the impeller exit is such that the equivalent blades number is doubled with respect to a conventional configuration obtained by the coupling of two single suction impellers.

With reference to FIG. 2, the section 33 corresponds to the inlet of a channel of an impeller of the state of the art, and area 32 corresponds to the outlet of a channel of an impeller of the state of the art.

With reference to FIGS. 5 and 11, the section labeled 35 corresponds to the inlet of a channel of the new impeller, and the area labeled 34 corresponds to the outlet of a channel of the new impeller.

It is apparent that, when comparing inter-blade channels of a double suction impeller of the prior art with the inter-blade channels of the new double suction impeller, the outlet area 34 of the inter-blade channels of the new double suction impeller has a rectangular shape with an aspect ratio much closer to 1 with respect to that of a state of the art impeller.

The cross section area of the inter-blade channel is designed to have control over the velocity of the flow inside the inter-blade channel. Moreover, the shape of the inter-blade channel is such as to avoid intersections between opposing channels and at the same time to maintain a target cross section area.

The shape of the new inter-blade channel is adapted to ensure a suitable distribution of the velocity inside the channel and to avoid channels intersection. Furthermore, the shape of the new inter-blade channel is such as the area of the cross section of the channel changes gradually, allowing for a precise control of the fluid velocity inside. This feature leads to higher performance and higher overall efficiency compared to solutions where the area of the internal section of the channel changes abruptly in order to avoid mutual intersection between channels or solutions where the area of the internal section of the channel is kept constant. In a preferred embodiment the cross section area of the channel is such as it allows the velocity of the fluid inside the channel being described by a function continuous in its first and second derivative. As a non-limiting example, such functions can be those represented by Bezier curves.

According to another embodiment, shown in FIG. 11, the inter-blade channels of the double suction impeller have a variable cross section shape. The channel starts at the inlet having an essentially quadrilateral cross-section. Then, moving along the flow toward the outlet, the channel cross-section becomes a five sided polygon until a small length before the impeller outlet where the channel cross-section changes back to being substantially quadrilateral. The additional fifth side defines the channel cross section between the suction side and the hub surfaces of the channel. The length of the additional fifth side of the channel cross section starts from zero, increases until it reaches its maximum length and then decreases back to zero.

Finally, benefits introduced by the new double suction impeller include, inter alia, reduction of the slip and reduction of hydraulic losses. These reductions may translate to an efficiency increase of about 3% to 4% and, ultimately, to a lower operating expenditure and lower capital expenditure.

The above description of exemplary embodiments refers to the accompanying drawings. The same reference numbers in different drawings identify the same or similar elements. The following detailed description does not limit the invention. Instead, the scope of the invention is defined by the appended claims.

Throughout the specification, the terms "one embodiment" or "an embodiment" indicate that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. The above detailed description does not limit the scope of the claimed invention. Instead, the scope of the invention is defined by the appended claims.

The invention claimed is:

1. A double suction impeller, comprising:
   a plurality of blades attached to a hub and to a left side shroud and to a right side shroud, the left side shroud and the right side shroud each having a center aperture, and an outer edge of the left side shroud and the outer edge of the right side shroud define an impeller exit;
   each pair of adjacent blades of the plurality of blades defines a plurality of inter-blade channels configured to connect a plurality of input apertures located within the center apertures of the left side shroud and the right side shroud to a plurality of output apertures located on the impeller exit,
   wherein each of the plurality of inter-blade channels has a variable cross section shape, the variable cross section shape being quadrilateral at an inlet of each inter-blade channel of the plurality of inter-blade channels, then becoming at least a five sided polygon, and then becoming quadrilateral again before the impeller exit.

2. The double suction impeller of claim 1, wherein the plurality of inter-blade channels comprises left side inter-blade channels having their respective input apertures located within the center aperture of the left side shroud, and right side inter-blade channels having their respective input apertures located within the center aperture of the right side shroud.

3. The double suction impeller of claim 2, wherein the left side inter-blade channels and the right side inter-blade channels intersect a median plane of the impeller exit in a configuration where the plurality of output apertures of the left side inter-blade channels are in alternating alignment with the plurality of output apertures of the right side inter-blade channels on the impeller exit.

4. The double suction impeller of claim 1, wherein the double suction impeller is made of a single piece.

5. The double suction impeller of claim 1, wherein the double suction impeller is made of two pieces.

6. The double suction impeller of claim 1, wherein the hub defines a tubular center bore configured to receive an impeller drive shaft.

7. The double suction impeller of claim 6, wherein the center apertures of the left side shroud and the right side shroud are adjacent to the tubular center bore.

8. The double suction impeller of claim 7, wherein the center apertures of the left side shroud and the right side shroud comprise an aperture edge and an aperture rim.

9. The double suction impeller of claim 1, further comprising a housing having axial inlets and a circumferential volute or diffuser outlet passage.

10. The double suction impeller of claim 1, wherein the plurality of blades are integrally attached to the hub.

11. A centrifugal pump comprising the double suction impeller of claim 1.

12. A hydraulic power recovery turbine comprising the double suction impeller of claim 1.

* * * * *